Figure 2:
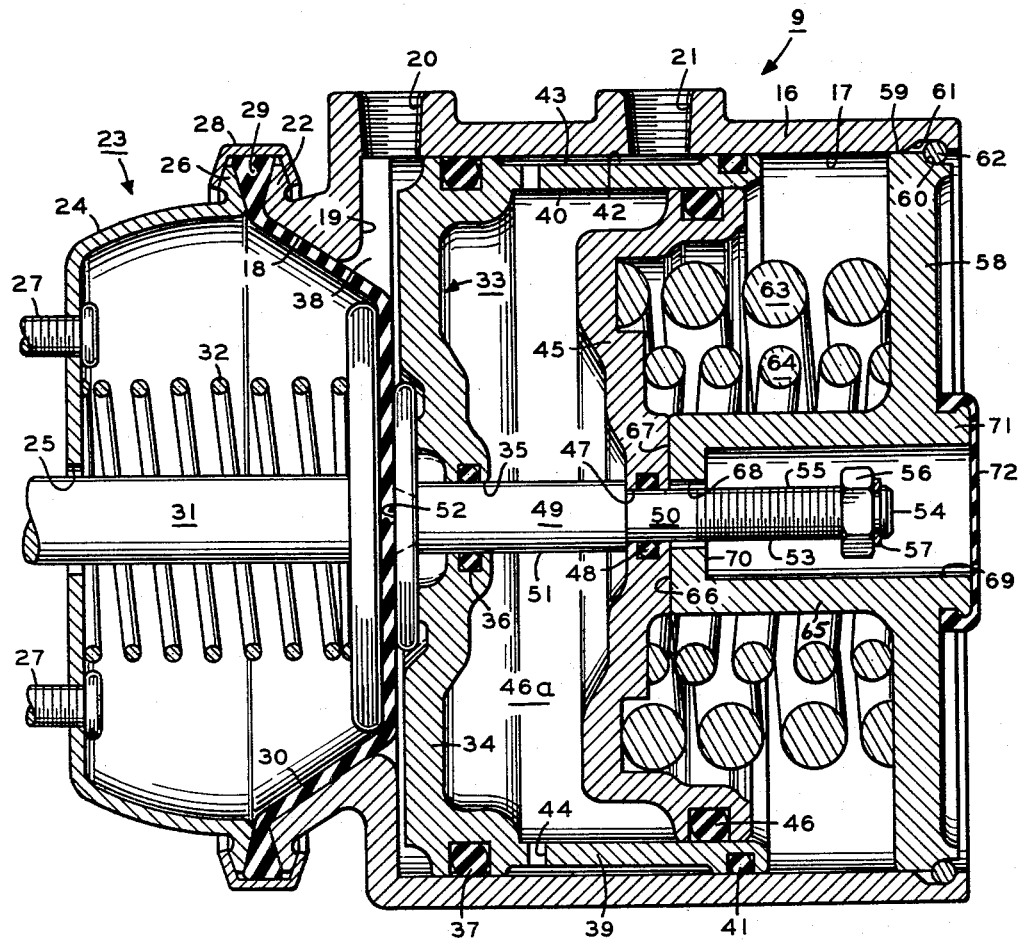

April 6, 1965  O. B. CRUSE  3,176,594
FRICTION DEVICE OPERATING MECHANISM
Filed Oct. 12, 1962  2 Sheets-Sheet 1

INVENTOR
OLIVER B. CRUSE
BY

April 6, 1965     O. B. CRUSE     3,176,594

FRICTION DEVICE OPERATING MECHANISM

Filed Oct. 12, 1962     2 Sheets-Sheet 2

INVENTOR
OLIVER B. CRUSE
BY 3,176,594
FRICTION DEVICE OPERATING MECHANISM
Oliver B. Cruse, Florissant, Mo., assignor to Wagner Electric Corporation, St. Louis, Mo., a corporation of Delaware
Filed Oct. 12, 1962, Ser. No. 230,140
16 Claims. (Cl. 92—51)

This invention relates to friction device operating mechanisms and in particular to those having resilient emergency actuating means therein.

In the past, many friction device operating mechanisms have been devised wherein resilient means were effective upon the failure of fluid pressure from a source of fluid pressure to mechanically energize a friction device normally energized by applying fluid pressure from said source to a fluid pressure responsive friction device actuator; however, an undesirable feature of such prior friction device operating mechanisms and systems was that the force of said resilient means and the force of said fluid pressure responsive actuator were concertly effective to energize said friction device, and if applied simultaneously, such additive forces frequently attained a magnitude great enough to damage the component parts of said friction device as well as other parts of the friction device operating system associated therewith.

The principle object of the present invention is to provide a friction device operating mechanism and system which overcomes the abovementioned undesirable feature of the prior friction device operating mechanism and system.

Another object of the present invention is to provide a friction device operating mechanism which cannot be actuated by additive resilient and fluid pressure responsive means thereby obviating the possibility of damaging the friction device and other component parts of the friction device operating systems.

Another object of the present invention is to provide a friction device operating mechanism having a reduced length.

Still another object of the present invention is to provide a friction device operating mechanism having telescopically arranged and resiliently powered emergency pistons therein.

And still another object of the present invention is to provide a friction device operating mechanism having resiliently biased housing means removably secured together by clamping means, and safety means to prevent accidental removal of said clamping means and obviate expulsion of said resiliently biased housings.

These and still other objects and advantages will become apparent hereinafter.

Briefly, the invention embodies fluid pressure responsive actuator means for normally energizing a friction device in response to fluid pressure metered thereto from a source of fluid pressure, and a pair of piston means normally biased toward opposed inoperative positions by pressure fluid from said source, one of said piston means having a working end thereof urged by spring means toward an operative position to mechanically energize said friction device, and the other of said piston means being responsive to the metered fluid pressure from said source to oppose the spring force when said one piston means is in the operative position. The invention also embodies clamping means for releasable engagement between resiliently biased, separable housing means, and means to prevent release of said clamping means and obviated expulsion of said separable housing means in response to the resilient force.

Figure 1:
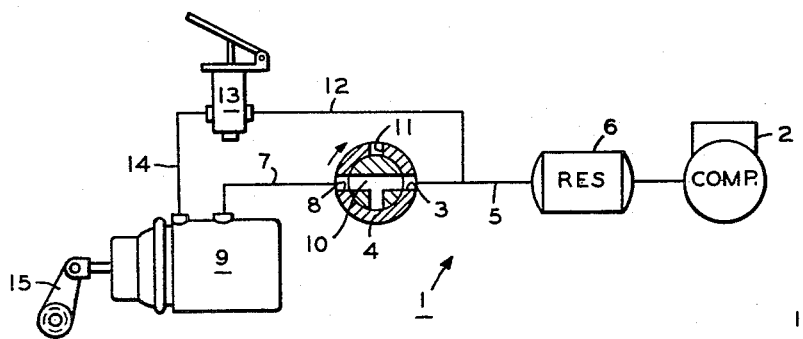
Figure 4:
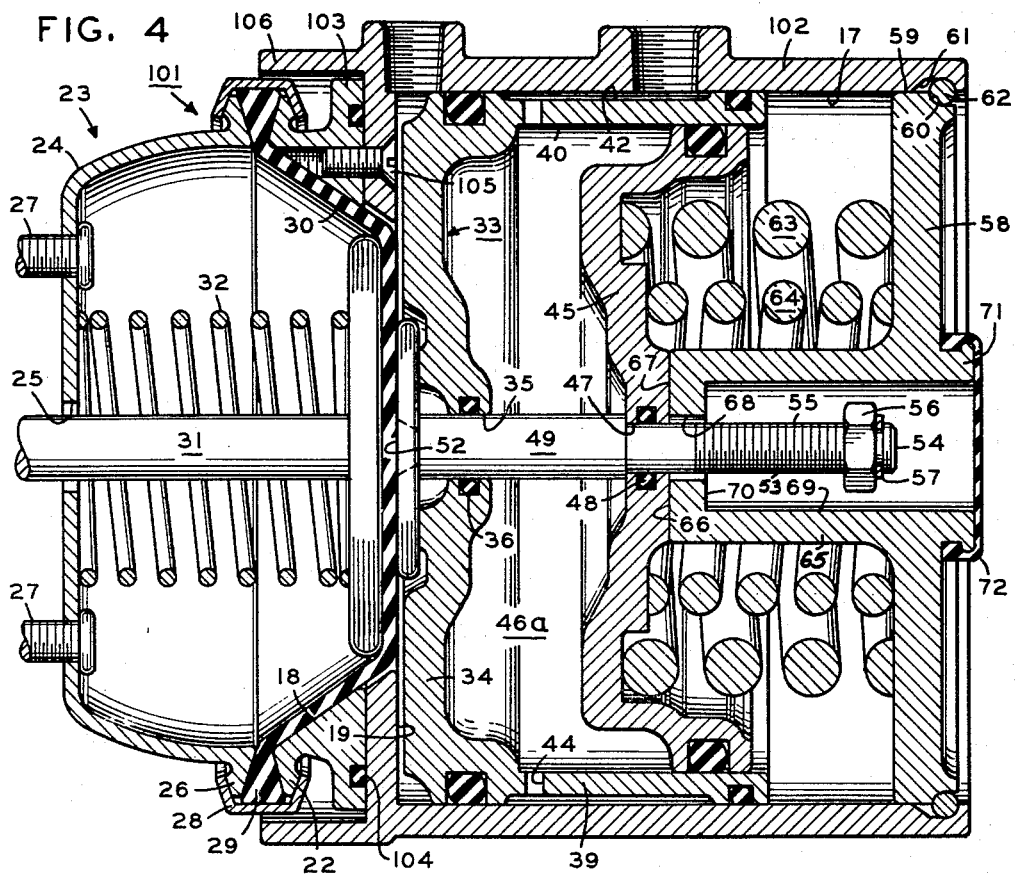
Figure 3:
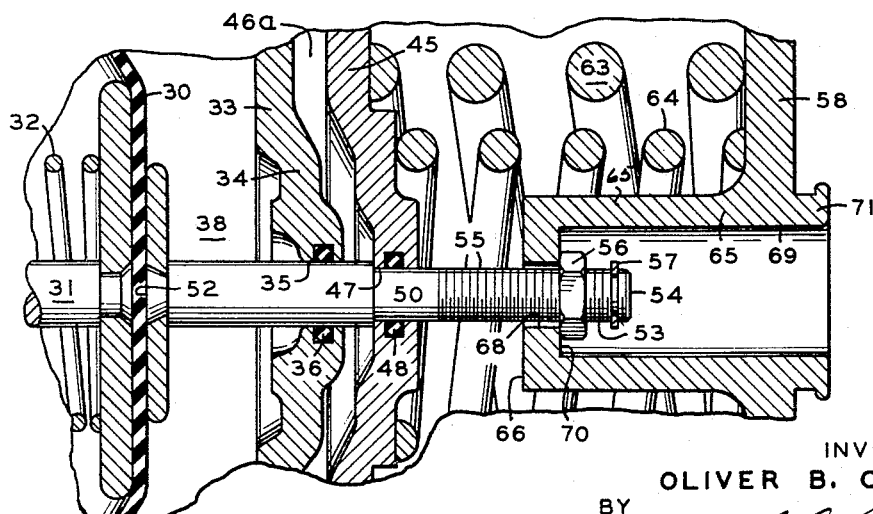

The invention also consists in the parts and in the arrangements and combination of parts hereinafter described and claimed. In the accompanying drawings which form a part of the specification and wherein like numerals refer to like parts wherever they occur:

FIG. 1 is a diagrammatic view of a friction device operating system showing a friction device operating mechanism embodying the present invention therein, FIG. 2 is a greatly enlarged cross-sectional view of the friction device operating mechanism shown in FIG. 1, FIG. 3 is a fragmentary cross-sectional view showing the emergency piston of FIG. 2 biased toward an operative position, and FIG. 4 is a cross-sectional view of another friction device operating mechanism embodying the present invention.

Referring now to FIG. 1 in detail, a friction device actuating system, indicated generally at 1, is provided with fluid pressure generating means, such as compressor 2, which is connected to an inlet 3 of a charging or control valve 4 by a conduit 5, and a fluid pressure storage reservoir 6 is interposed in the conduit 5 providing, in combination with the compressor 2, a source of fluid pressure. Another conduit 7 is interposed between an outlet 8 of the charging valve 4 and the emergency port of a friction device operating mechanism or actuating cylinder 9. The charging valve 4 is provided with rotatable passage means 10 connecting the inlet 3 with the outlet 8; however, said passage means 10 can be rotated clockwise (in the direction of the arrow) to a position interrupting pressure fluid communication between said inlet and outlet and establishing pressure fluid communication between said outlet and an exhaust port 11 to vent said outlet to atmosphere. A conduit 12 has one end intersecting the conduit 5 and the other end thereof connecting with the inlet side of an application valve 13, and another conduit or service line 14 is interposed between the outlet or service side of said application valve and the service port of the actuating cylinder 9. To complete the system 1, the push rod of the actuating cylinder 9 is pivotally connected with linkage means or actuating lever, such as slack adjuster 15, for energizing a friction device (not shown).

The actuating cylinder 9, FIG. 2, is provided with a housing 16 having a bore 17 and an axially aligned tapered bore 18 with a shoulder 19 formed at the juncture of said bore and tapered bore. A service port 20 which receives the conduit 14, as previously mentioned, is provided in the housing 16 connecting with the bore 17 adjacent to the shoulder 19, and an emergency port 21 which receives the conduit 7, as previously mentioned, is also provided in the housing 16 connecting with the bore 17 adjacent to the mid-portion thereof. The housing 16 is also provided with a peripheral flange 22 on the leftward end thereof, and a mounting end plate or fixed housing 23 is provided with a concave or dish-shaped end wall 24 having a centrally located venting aperture 25 therein and a peripheral flange 26 positioned in opposed relation with the peripheral flange 22. The end plate housing 23 is also provided with a plurality of mounting studs 27 which are fixedly attached to the end wall 24 by suitable means, such as an upset weld, said mounting studs being adapted for connection with a cooperating mounting bracket (not shown) on or adjacent the friction device. A conventional releasable clamping band 28 is positioned in clamping engagement between the opposed peripheral flanges 22 and 26 serving to maintain a peripheral bead 29 of a diaphragm 30 clamped in sealable abutting engagement therebetween. A push rod 31 extends coaxially through the venting aperture 25 having an exterior or working end pivotally connected with the slack adjuster 15, as previously mentioned, and an interior end biased into engagement with the diaphragm 30 by the compressive force of a return spring 32 interposed between the housing end wall 24 and said push rod.

A movable wall member or cup-shaped piston 33 is provided with a radially extending head portion 34 normally in abutting engagement with the shoulder 19, and a centrally located aperture or bore 35 is provided in the head portion 34 having an O-ring 36 sealably disposed therein. Another O-ring 37 is sealably disposed in the peripheral surface of the head portion 34 in sealable engagement with the housing bore 17 wherein an expansible service or actuating chamber 38 is formed in the housing bore 17 and tapered bore 18 between the diaphragm 30 and the head portion 34 of the piston 33, said actuating chamber 38 being in open pressure fluid communication with the service port 20 at all times. An axially extending sleeve portion 39 is integrally formed with the piston head 34 and is provided with a bore 40 therein, and the rightward or free end of said sleeve 39 is slidably engaged with the portion of the housing bore 17 rightwardly of the emergency port 21. Another O-ring 41 is sealably disposed in the peripheral surface of the sleeve 39 adjacent to the free end thereof in sealable engagement with the housing bore 17, and an annular recess 42 is provided in the peripheral surface of said sleeve intermediate the O-rings 37 and 41 forming an annular chamber 43 between said sleeve and the housing bore 17 which is at all times in pressure fluid communication with the emergency port 21. A plurality of cross passages 44 are provided in the sleeve 39 adjacent the leftward end thereof to connect the annular chamber 43 with the sleeve bore 40.

A cup-shaped emergency piston 45 is slidably received in the piston sleeve bore 40 having an O-ring 46 sealably disposed in the peripheral surface thereof in sealable engagement with said sleeve bore, and an emergency chamber 46a is formed in said sleeve bore between said emergency piston and the head portion 34 of the piston 33, said emergency chamber being in fluid pressure communication with the emergency port 21 at all times through the passages 44 and annular chamber 43. The emergency piston 45 is also provided with the centrally located aperture 47 having an O-ring 48 sealably disposed therein, and a piston extension or driven member 49 is provided with a reduced portion 50 adjacent the mid-portion thereof which is slidably received in the emergency piston aperture 47 in sealable engagement wtih the O-ring 48 therein. The driven member 49 is provided with an extension portion 51 leftward of the reduced portion 50 which is slidably received in the bore 35 of the piston 33 in sealable engagement with the O-ring seal 36 therein, and a working end 52 is provided on the leftward extension portion 51 in the actuating chamber 38 normally in abutting or driving engagement with the diaphragm 30. The driven member 49 is also provided with an extension portion 53 rightward of the reduced portion 50, and a free end 54 is provided on the rightward extension portion 53. The rightward extension portion 53 is threaded, as at 55, substantially between the reduced portion 50 and the free end 54 thereof, and a driving nut or member 56 is threadedly received thereon (to be discussed hereinafter). A snap or retaining ring 57 is carried in the rightward extension 53 adjacent to the free end 54 thereof to retain said driving member 56 against displacement.

A removable annular base wall or closure member 58 is provided with a peripheral surface 59 in sliding and guiding engagement in the rightward end of the housing bore 17, and an annular recess 60 is provided in said annular surface. The housing bore 17 is also provided with an annular recess 61 adjacent the rightward or free end thereof, and a split lock or retaining ring 62 is positioned in said housing recess 61. The compressive forces of concentrically positioned emergency springs 63 and 64 interposed between the emergency piston 45 and the base wall 58 serve not only to bias the emergency piston 45 and extension 49 in a leftwardly working direction but also serve to bias the base wall recess 60 into abutting engagement with the retaining ring 62 in the housing recess 61 to retain said base wall against displacement from the housing bore 17. The base wall 58 is provided with a centrally located cylindrical extension 65 having an abutment surface 66 on the interior or free end 67 thereof for engagement with the emergency piston 45, and stepped bores 68 and 69 are centrally provided through the cylindrical base wall extension 65 in coaxial spaced relation with the rightward extension portion 53 of the driven member 49. A shoulder or bearing surface 70 is formed at the juncture of the stepped bores 68 and 69, and the exterior end 71 of the cylindrical base wall extension 65 is closed by a closure member, such as resilient boot 72, to prevent the entry of foreign particles into the stepped bores 68 and 69 and the housing bore 17.

In the operation with the component parts of the actuating cylinder 9 positioned as above described, assume that normal operating conditions exist wherein the reservoir 6 is charged with fluid pressure above a predetermined amount from the compressor 2, and said reservoir is connected in fluid pressure communication with the emergency chamber 46a through the sleeve passage 44, the annular chamber 43, the emergency port 21 of the housing 16, the conduit 7, the outlet 8 of the control valve 4, passage means 10 and inlet 3, and the conduit 5. The fluid pressure so transmitted to the emergency chamber 46a acts on the effective area of the piston 33 to normally engage the piston head 34 with the housing shoulder 19, and said fluid pressure also acts on the effective area of the emergency piston 45 creating an emergency force to maintain said emergency piston in an inoperative or non-working position in abutment with the free end 67 of the base wall extension 65 against the compressive force of the compressed emergency springs 63, 64. With the component parts of the actuating cylinder 9 positioned as above described and as shown in the drawings, the friction device (not shown) is de-energized.

If the operator desires to make a normal service application to energize the friction device and effect deceleration or a complete stop, a manual force applied on the application valve 13 meters fluid pressure from the reservoir 6 through the conduits 5 and 12, said application valve, the service line 14, the service port 20 of the housing 16, and into the actuating chamber 38. The fluid pressure so established in the actuating chamber 38 acts on the effective area of the diaphragm 30 to create a service or actuating force to move said diaphragm and push rod 31 leftwardly against the return spring 32 actuating the working end of said push rod to rotate the slack adjuster 15 and energize the friction device. It should be noticed that the fluid pressure in the actuating chamber 38 acting on the effective area of the piston 33 creates an opposite service force which is substantially equal to the service force, and said opposite force is opposed by the fluid pressure in the emergency chamber 46a acting on the effective area of the piston 33; therefore, the piston 33 normally remains in its original position in engagement with the housing shoulder 19. Removal of the applied force from the application valve 13 effects exhaustion of fluid pressure from the actuating chamber 38 through the service port 20, the conduit 14 and the exhaust port of the application valve 13 to eliminate the actuating force, and the compressive force of the return spring 32 moves the slack adjuster 15, the push rod 31, and the diaphragm 30 to their original positions.

In an emergency operating condition when the pressure in the reservoir 6 is reduced below the predetermined amount due to leaks in the system 1 or a non-producing compressor 2, or the like, the fluid pressure in the emergency chamber is correspondingly reduced thereby reducing the emergency force opposing the compressive forces of emergency springs 63, 64. When the magnitude of the spring forces overcomes that of the reduced emergency force, the emergency springs 63, 64 move the emergency piston 45 leftwardly in a working direction in the sleeve bore 40 toward an operative position adjacent the piston head 34. The piston extension 49 is concertly moved with said emergency piston to actuate the leftward or working end 52 thereof in a work-producing direction in the actuating chamber 38 effecting simultaneous leftward movement of the diaphragm 30 and push rod 31 to rotate the slack adjuster 15 and effect mechanical emergency energization of the friction device.

During this mechanical emergency energization of the friction device, it should be noticed that the operator may make a service application, as previously described; however, when the magnitude of the opposite service force created upon the introduction of service fluid pressure into the actuating chamber 38 overcomes the magnitude of the force created by the reduced fluid pressure in the emergency chamber 46a acting on the effective area of the piston head 44, the piston 33 is moved rightwardly in the housing bore 17 into engagement with the emergency piston 45 to oppose the compressive forces of emergency springs 63, 64. Since the opposite force and the service force are substantially equal in magnitude, it is apparent that the opposite force opposes the compressive force of springs 63, 64 to reduce the magnitude thereof and obviate the compounding of the spring forces and the service force. In other words, the substantially equal and opposing service and opposite forces limit the intensity of the mechanical energization of the friction device under emergency operating conditions by preventing compounding of the friction device energizing forces thereby obviating the possibility of damaging the friction device and/or other component parts of the system 1 and cylinder 9. When the service application is terminated and the fluid pressure is exhausted from the actuating chamber 38, as above described, the reduced fluid pressure in the emergency chamber acting on the effective area of the piston head 34 will return the piston 33 to its original position while the compressive forces of springs 63, 64 serve to maintain the mechanical energization of the friction device.

With the component parts of the system 1 and actuating cylinder positioned as above described, the friction device is mechanically energized to effect a vehicle emergency stop. Often such emergency stops occur at inopportune times and place the vehicle in a dangerous position with regard to other vehicles on the road; therefore, after such emergency stop occurs, it is often advantageous to move the vehicle to a less dangerous position in order to correct the failure of the system 1 and subsequently re-establish normal operating conditions wherein the fluid pressure is greater than the predetermined amount.

Referring now to FIGS. 2 and 3, the driving member 56 is provided for bearing engagement with the shoulder 70 in the base wall extension 65 to positively contain the compressive forces of springs 63, 64 and retractively move the emergency piston 45 to its inoperative position to de-energize the friction device under emergency conditions, as hereinafter described. With the boot 71 removed from the base wall extension 65, a tool (not shown) is inserted into the cylinder bore 69 into driving engagement with the driving member 56. When a manual force is applied to rotate the tool and driving member 56, the threaded engagement between said driving member and the rightward piston extension 53 effects leftward movement of said driving member into abutting bearing engagement with the shoulder 70 in the end wall extension 65; and upon further rotation of the driving member 56, the threaded engagement effects concert rightward movement of the driven member 49 and emergency piston 45 in the sleeve bore 40 of the piston 33 against the compressive force of the springs 63, 64. In view of the above, it is apparent that the compressive forces of springs 63, 64 are now positively contained between the emergency piston 45 and the base wall 58 through the bearing engagement of the driving member 56 and shoulder 70. When the emergency piston 45 is so moved to its inoperative position, return spring 32 also moves the parts associated with said emergency piston and piston extension 49 in follow-up relation wherein the friction device is de-energized so that the vehicle can now be moved to a more advantageous and less dangerous position. With the force of the emergency springs 63, 64 so contained, the clamping band 28 may be removed to effect separation of the separable housings 16 and 23 wherein the various component parts in the actuating chamber 38 can be serviced without fear of the housing 16 being expelled from the end plate 23 by the force of said emergency springs. Upon said disassembly of the housings 16 and 23, the base wall 58 and power piston 45 and parts associated therewith are manually movable toward the left in the piston bore 40 and cylinder bore 17, respectively, so that the snap ring 62 can be removed from the groove 61 which subsequently permits removal of all of the component parts from the cylindrical bore 17 for the service purpose.

When the fluid pressure failure has been corrected and the fluid pressure in the reservoir 6 is increased to an amount greater than the predetermined amount wherein normal operating conditions are now re-established, the fluid pressure in the emergency chamber 46a of the actuating cylinder 9 is correspondingly increased to return the piston 33 to its original position, if need be, and to re-establish the magnitude of the emergency force. When the magnitude of the emergency force overcomes that of the compressive forces of springs 63, 64, the emergency piston 45 will be maintained in its inoperative position, and the driving member 56 may now be freely returned to its original position adjacent the free end 54 of the rightward piston extension 53.

Of course, the operator may initiate the emergency function of the actuating cylinder 9, if desired, by "dynamiting" the system 1. To "dynamite," the operator merely rotates the rotatable passage means 10 of the charging valve 4 in a clockwise direction (as shown by the arrow in FIG. 1) to align the passage means 10 between the outlet 8 and the exhaust port 11 thereby exhausting fluid pressure from the emergency chamber 46a of the cylinder 9 through the passage 44, annular passage 42 and emergency port 21 into the conduit 7 and therefrom via said outlet, passage means and exhaust port of the charging valve 4 to atmosphere. With the emergency chamber 46a vented to atmosphere, the emergency function of the actuating cylinder 9 is initiated, as described hereinbefore, to energize the friction device.

Referring now to FIG. 4, a friction device operating mechanism 101 is shown having substantially the same component parts and functioning in the same manner as the previously described friction device operating mechanism with the following exceptions. The friction device operating mechanism or actuating cylinder 101 is provided with separable housings 102 and 103 having an O-ring 104 sealably disposed therebetween, and a plurality of screws 105 normally retain said housings against displacement. The housing 102 is provided with a plurality of axially extending, integrally formed extensions or fingers 106 which extend into radially spaced relation with the clamping band 28. The extensions 106 are juxtaposed with the removable clamping band 28 to obviate removal thereof from the flanges 22 and 26 of the housings 23 and 16 until the housings 102 and 103 are disassembled. To disassemble the housings 102 and 103, the driving member 56 is actuated to positively contain the forces of the emergency springs 63, 64 between the power piston 45 and the base wall 58, and the component parts in the housing bore 17 are removed therefrom, as previously described. Upon removal of the component parts from the housing bore 17, a screw driver or the like (not shown) can be inserted through the housing bore 17 to remove the screws 105 to separate the housings 102 and 103 and move the extensions 106 from spaced relation with the clamping band 28. The clamping band 28 can now be removed from engagement between the housings 23 and 103 in order to service the diaphragm 30 and other component parts within the housing 23.

It is apparent that the housing extensions 106 are provided in juxtaposition with the removable clamping band 28 to normally obviate the removal thereof from clamping engagement with the housings 23 and 103. This is a safety feature to prevent explusion of the housings 102 and 103 from the housing 23 by the forces of the emergency springs 63 and 64 in the event that emergency conditions prevail in the actuating cylinder 101 or that said actuating cylinder has been dynamited.

It is also apparent that the component parts in the housing bore 17 must be removed therefrom which, of course, obviates the propelling effect of the emergency springs 63, 64 on the housings 102 and 103 before the screws 105 can be removed to separate housings 102 and 103 and move the extensions 106 from their normal spaced relation with the clamping band 28.

It is now apparent that a novel friction device operating mechanism or actuating cylinder meeting the objects set out hereinbefore is provided and that changes and modifications in the disclosure may be made by those skilled in the art without departing from the spirit of the invention as defined by the claims which follow.

What I claim is:

1. A friction device operating mechanism comprising a housing having a bore and an aligned tapered bore therein, a shoulder formed at the juncture of said housing bore and tapered bore, an end wall connected with said housing at one end thereof and closing said housing bore, an end plate, a diaphragm clamped between said housing at the other end thereof and said end plate closing said tapered bore, a push rod connected with said diaphragm and having a working end extending exteriorly of said end plate, a first piston including a head portion normally engaged with said shoulder and an integral sleeve portion slidable in said housing bore, a first expansible chamber in said housing bore and tapered bore between said diaphragm and said first piston head portion, a sleeve bore in said first piston sleeve portion and coaxial with said housing bore, a centrally located aperture in said first piston head portion between said first chamber and sleeve bore, a second piston slidable in said sleeve bore, an extension connected with said second piston and slidable in said aperture in said first piston head portion, said extension having a working end in said first chamber for driving engagement with said diaphragm, a second expansible chamber in said sleeve bore between said first piston head portion and said second piston, a peripheral recess in said first piston sleeve portion, passage means in said first piston sleeve portion connecting said peripheral recess with said second chamber, a first fluid pressure port in said housing connecting with said first chamber, a second fluid pressure port in said housing connecting with said peripheral recess, said passage means and said second chamber, and spring means biased between said end wall and second piston, said spring means normally urging said second piston and extension in a working direction to drivingly engage the working end of said extension with said diaphragm and concertly move said diaphragm and said push rod to actuate the working end of said push rod when the fluid pressure at said second port is less than a predetermined amount, said diaphragm being movable in a working direction at response to fluid pressure in said first port to actuate said push rod and the working end thereof, and said first piston being responsive to fluid pressure at said first port to oppose the compressive force of said spring means.

2. A friction device operating mechanism comprising a housing having a bore therein, an end plate, a diaphragm clamped between said housing and end plate closing said bore, a push rod connected with said diaphragm and having a working end extending exteriorly of said end plate, a first piston having an integral sleeve portion slidable in said housing bore, a first expansible chamber in said housing bore between said first piston and diaphragm, a centrally located aperture in said first piston, a second piston slidable in said sleeve portion, extension means on said first piston and slidable in said aperture, said extension means having a working end in said first chamber for driving engagement with said diaphragm, a second expansible chamber in said sleeve portion between said first and second pistons, a peripheral recess in said sleeve portion, cross-passage means in said sleeve portion between said peripheral recess and second chamber, a first fluid pressure port in said housing connecting with said first chamber, a second fluid pressure port in said housing connecting with said peripheral recess, said cross-passage means and said second chamber, spring means biased between said housing and second piston, said spring means normally urging said second piston and extension in a working direction to drivingly engage the working end of said extension with said diaphragm and concertly actuate said diaphragm, said push rod and the working end thereof when the fluid pressure at said second port is less than a predetermined amount, said diaphragm being movable in a working direction in response to fluid pressure at said first port to actuate said push rod and the working end thereof, and said first piston being movable in response to fluid pressure in said first port into engagement with said second piston to oppose said spring means.

3. A friction device operating mechanism comprising a cylinder, an end plate, a diaphragm clamped in sealing engagement between an end of said cylinder and said end plate, a push rod connected with said diaphragm and having a working end extending exteriorly of said end plate, a pair of relatively movable piston means, one of said piston means being slidable in said cylinder, a bore in said one piston means, the other of said piston means being slidable in said bore, a first expansible chamber in said cylinder between said diaphragm and one piston means, a second expansible chamber in said bore between said piston means, extension means on said other piston means extending through said one piston means into said first chamber for driving engagement with said diaphragm, resilient means biased between said cylinder and other piston means, means for introducing fluid pressure into said second chamber, said one piston means being movable to an inoperative position in response to fluid pressure in said second chamber and said other piston means being movable to an inoperative position against said spring means in response to fluid pressure in said second chamber above a predetermined amount, said spring means being extendable to move said other piston means toward an operative position when the fluid pressure in said second chamber is less than a predetermined amount to drivingly engage the working end of said extension means with said diaphragm and concertly move said diaphragm and said push rod to energize the working end of said push rod, other means for introducing fluid pressure into said first chamber, said diaphragm being movable in response to fluid pressure in said first chamber to move said push rod and energize the working end thereof, and said other piston means being movable towards an operative position into engagement with said one piston means to oppose said spring means when the fluid pressure in said first chamber is greater than that in said second chamber.

4. A friction device operating mechanism comprising a cylinder, an end plate, diaphragm means clamped between said cylinder and end plate including a working portion extending exteriorly of said end plate, piston means slidable in said cylinder and defining with said diaphragm means an expansible fluid pressure chamber, a bore in said piston means, other piston means slidable in said bore including extension means for driving engagement with said diaphragm means, another expansible fluid pressure chamber defined in said bore between said first named and other piston means, said diaphragm means being movable in response to fluid pressure in said first named chamber to energize said working portion, and resilient means urging said other piston means in a direction to drivingly engage said extension means with said diaphragm means to mechanically energize said working portion when the fluid pressure in said other chamber is less than a predetermined amount, said first named piston means being responsive to fluid pressure in said first named chamber to oppose the force of said resilient means.

5. A friction device operating mechanism comprising a cylinder and an end plate, means for releasably clamping said cylinder and end plate against displacement, a diaphragm clamped between said cylinder and end plate, a push rod connected with said diaphragm and having a working end extending exteriorly of said end plate, a pair of relatively movable piston means, one of said piston means being slidable in said cylinder and having a bore therein, an expansible fluid pressure chamber defined in said cylinder between said diaphragm and said one piston means, the other of said piston means being slidable in said bore, another expansible fluid pressure chamber defined in said bore between said piston means, extension means on said other piston means extending through said one piston means into said first named chamber for driving engagement with said diaphragm, means for introducing fluid pressure into said first named chamber, said diaphragm being movable in response to fluid pressure in said first named chamber to move said push rod and energize the working end thereof, means for introducing fluid pressure into said other chamber, and resilient means biased between said other piston means and cylinder to urge said other piston means in a direction to drivingly engage said extension means with said diaphragm and effect concert movement of said diaphragm and push rod to energize the working end thereof when the fluid pressure in said other chamber is less than a predetermined amount, said one piston means being movable toward engagement with said other piston means to oppose the force of said resilient means in response to fluid pressure in said first named chamber.

6. A friction device operating mechanism comprising a pair of housings, means for releasably clamping said housings against displacement, diaphragm means clamped between said housings including a working portion extending exteriorly of one of said housings, piston means slidable in the other of said housings, an expansible fluid pressure chamber defined in said other housing between said piston means and diaphragm means, means for introducing fluid pressure into said chamber, said diaphragm means being movable in response to fluid pressure in said chamber to energize the working portion thereof, a pair of stepped bores extending through said piston means, resiliently urged means slidable in said stepped bores and adapted for mechanical driving engagement with said diaphragm means, another expansible chamber defined in the larger of said stepped bores between said piston means and resiliently urged means, and other means for introducing fluid pressure into said other chamber, said resiliently urged means being movable into mechanical driving engagement with said diaphragm means to mechanically move said diaphragm means and energize the working end thereof in response to fluid pressure in said other chamber less than a predetermined amount, and said piston means being responsive to fluid pressure in said first named chamber to oppose movement of said resiliently urged means to mechanically energize the working portion of said diaphragm means.

7. A friction device operating mechanism comprising a housing, a pair of concentric piston means adapted for relative movement in said housing, an expansible fluid pressure chamber defined between said piston means, means within said housing including one of said piston means defining another expansible fluid pressure chamber, extension means on the other of said piston means extending through said one piston means and having a working end in said other chamber, and resilient means urging said other piston means in a direction to actuate said working end when the fluid pressure in said first named chamber is less than a predetermined amount, said one piston means being responsive to fluid pressure in said other chamber to oppose the resilient means movement of said other piston means.

8. The friction device operating mechanism according to claim 7 comprising disabling means defining a lost motion connection between said housing and other piston means, said disabling means being movable in response to an applied force to establish said lost motion connection and move said other piston means against said resilient means to de-energize said working end.

9. The friction device operating mechanism according to claim 7 comprising disabling means defining a lost motion connection between said housing and other piston means, said disabling means being movable in response to an applied force thereon to establish said lost motion connection and contain the force of said resilient means to prevent energization of said working end.

10. The friction device operating mechanism according to claim 7 comprising other extension means on said other piston means opposite said first named extension means, a cylindrical extension on said housing co-extensive with at least a portion of said other extension means, and disabling means threadedly received on said other extension means and defining a lost motion connection with said cylindrical extension, said disabling means being threadedly movable on said other extension means in response to an applied force thereon into engagement with said cylindrical extension and thereafter movable into further threaded engagement with said other extension means to effect movement of said other piston means against said resilient means and de-energize said working end.

11. The friction device operating mechanism according to claim 10 comprising an abutment surface on said cylindrical extension and said disabling means, respectively, and normally spaced apart a predetermined distance to define said lost motion connection.

12. The friction device operating mechanism according to claim 7 comprising a closure member releasably secured to said housing, said resilient means being engaged with said closure member and exerting a force thereon to effect separation from said housing, other extension means on said other piston means, a cylindrical extension on said closure member and co-extensive with at least a portion of said other extension, and disabling means defining a lost motion connection between said cylindrical extension and said other extension, said disabling means being initially movable in response to an applied force thereon to establish said lost motion connection and thereafter movable to effect movement of said other piston means against said resilient means to de-energize said working end.

13. The friction device operating mechanism according to claim 7 comprising a bore in said housing in which said one piston means is slidable, a closure member slidable in said bore, displacement preventing means releasably secured with said housing adjacent to the open end of said bore, a closure member slidable in said bore, said resilient means being engaged with said closure member and normally urging said closure member into engagement with said displacement preventing means, other extension means on said other piston means in opposed relation with said first named extension means, a cylindrical extension on said closure member and co-extensive with at least a portion of said other extension means, and disabling means threadedly engaged with said other extension and defining a lost motion connection with said cylindrical extension, said disabling means being initially threadedly movable in response to an applied force into engagement with said cylindrical extension and thereafter movable in response to the applied force into further threaded engagement with said other extension to move said other piston means and de-energize the working end thereof and contain the force of said resilient means between said other piston means and closure member, said closure member being slidable in said bore in response to an applied force when the force of said resilient means is contained to permit the release of said displacement preventing means from said bore and the subsequent displacement of said closure member and piston means from said bore.

14. A friction device operating mechanism comprising a housing, piston means including a sleeve portion slidable in said housing, means within said housing including said piston means defining an expansible fluid pressure chamber, other piston means slidable in said sleeve portion and defining therewith another expansible fluid pressure chamber in said first named piston means, extension means on said other piston means having a working end in said first named chamber, and resilient means urging said other piston means in a direction to energize said working end when the fluid pressure in said other chamber is less than a predetermined amount, said first named piston means being responsive to fluid pressure in said first named chamber to oppose the resilient means movement of said other piston means.

15. A friction device operating mechanism comprising a housing, piston means including a head portion and an integral sleeve portion slidable in said housing, means within said housing including said head portion defining an expansible fluid pressure chamber, other piston means slidable in said sleeve portion and defining with said head portion another expansible chamber in said sleeve portion, extension means on said other piston means extending through said head portion and having a working end thereon in said first named chamber, and resilient means engaged between said other piston means and housing, said resilient means urging said other piston means and extension means in a direction to energize said working end when the fluid pressure in said other chamber is less than a predetermined amount and said first named piston means being responsive to fluid pressure in said first named chamber acting thereon to oppose the working direction movement of said other piston means by said resilient means.

16. A friction device operating mechanism comprising a housing, piston means including a head portion and a sleeve portion slidable in said housing, means within said housing including said head portion defining an expansible fluid pressure chamber therebetween, other piston means slidable in said sleeve portion and defining with said head portion another expansible fluid pressure chamber within said sleeve portion, extension means on said other piston means including a working end in said first named chamber, other means within said housing for engagement with said first named piston means to limit movement thereof toward said first named means in response to fluid pressure in said other chamber, and spring means engaged between said housing and other piston means, said other piston means being movable against said spring means to an inoperative position in response to fluid pressure in said other chamber in excess of a predetermined amount and said first named piston means being movable to an inoperative position into engagement with said other means in response to fluid pressure in said other chamber, said spring means serving to move said other piston means to an operative position to energize the working end of said extension means in response to fluid pressure in said other chamber less than the predetermined amount, and said first named piston means being movable to an operative position into engagement with said other piston means to oppose the force of said resilient means when the fluid pressure in said first named chamber exceeds that in said other chamber.

References Cited by the Examiner
UNITED STATES PATENTS

| 2,852,154 | 9/58 | Brown | 220—4 |
| 2,854,954 | 10/58 | Howze | 92—63 |
| 2,947,435 | 8/60 | Vocht | 220—4 |
| 2,957,599 | 10/60 | Lamb | 220—4 |
| 2,992,630 | 7/61 | Leighton et al. | 92—63 |

KARL J. ALBRECHT, *Acting Primary Examiner.*
RICHARD WILKINSON, *Examiner.*